United States Patent Office 3,809,740
Patented May 7, 1974

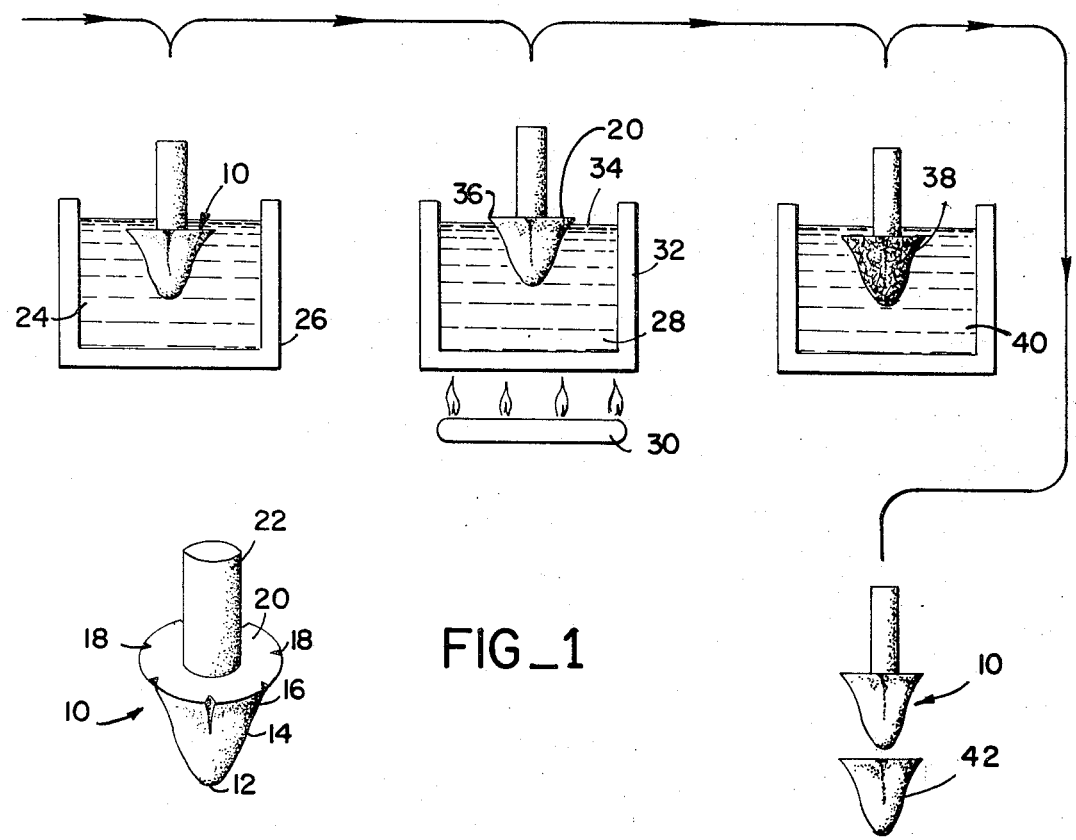
FIG_1
FIG_2
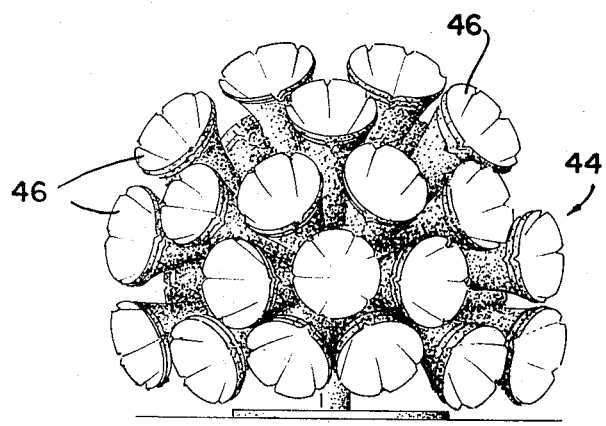
FIG_3

3,809,740
FLOWER CANDLE MOLDING PROCESS
Timothy S. Milonas and Janet O. Milonas, both of 278 Dennis Drive, Daly, Calif. 94518
Filed Jan. 7, 1972, Ser. No. 215,996
Int. Cl. B29c 13/00
U.S. Cl. 264—306    8 Claims

ABSTRACT OF THE DISCLOSURE

Detailed, finely shaped objects are prepared of relatively thin wax films by introducing a generally conically shaped mold of a porous material into cold water, dipping the wet mold into hot wax, allowing the wax to drain, and rapidly solidifying the wax by introducing the coated mold in cold water, whereby the shaped wax object is freely released from the mold.

BACKGROUND OF THE INVENTION

Field of the Invention

Candle making as an art form has been the subject of continued popular expansion and interest. Candles are formed in elaborate designs of great variation and intricacy. Not only are candles prepared commercially, but candle making has found wide use as a hobby.

Wax is a friable material with little tensile strength and good adherence to a wide variety of materials. Therefore, shaping sheets of wax into formed objects is extremely difficult. Flower petals, tulip shaped cups, or other decorative designs are only achieved with great difficulty and perseverance.

SUMMARY OF THE INVENTION

Finely detailed wax objects are formed by dipping a porous male mold member into cold water so as to absorb some of the cold water into the mold, followed by dipping the wet mould member into hot wax, removing the wax coated mold member from the hot wax and chilling the wax in cold water. The thin shaped sheet of wax then automatically releases from the mold member, having substantially the shape of the mold member. The wax composition has a major amount of a petroleum wax and minor amounts of natural waxes.

DESCRIPTION OF THE DRAWINGS

FIG. 1 is a flow diagram of the process employed in this invention.

FIG. 2 is a perspective view of a male mold member.

FIG. 3 is a front view of a hemispherical candle decorated with floral shaped wax decorations prepared from the mold depicted in FIG. 2.

DESCRIPTION OF THE SPECIFIC EMBODIMENTS

Decorative wax objects of thin films can be easily formed in a shape which can be variously described as conical, cup-like, tulip shaped, or having a parabolic cross-section. The significant factor is that the die is free of ridges, protuberances, extensions, elevations or the like, which would permit the wax to overlap in the horizontal direction. Various simple designs can be provided in the wax object. The wax objects can widely vary in size, being as small as a quarter of an inch and as large as a foot or more in their largest dimension. In most instances, the shaped object will have the largest dimension of from about ¼ of an inch to about 3 inches. The thickness of the walls can be varied from as thin as about 1/64 inch to as thick as about ¼ inch. Normally, the wall thickness of an object will be non-uniform, enhancing the decorative nature of the object.

Ridges, ribs, indentations, or other structural features, which do not interfere with the release of the wax object from the male mold, can be imparted to the wax object. Within the limitation that any structural feature of the mold may not be shaped so as to interfere with the release of the wax object, wide varieties in designs can be achieved.

The preparation of the wax objects can be carried out extremely simply by dipping a porous mold die of generally conical shape into ice water, so that the mold die absorbs some of the water. The mold die is then dipped into a hot wax melt, preventing the wax from flowing over the top edge of the mold. The coated mold is then rapidly transferred to a cold water bath and immersed in the bath. After removal from the cold water bath, the wax object will slip off of the mold, without any force being applied. Therefore, the wax object is free of any impressions, finger prints or distortions, and can be directly used for decorative purposes, such as decorating candles, flower arrangements, etc.

Turning now to a consideration of the drawings. In FIG. 2 is depicted an exemplary mold die 10. As indicated, the male mold die is relatively conically shaped but can have various structural features. The subject die has a rounded point 12, curves upwardly 14 and then flares outwardly 16. A plurality of indentations 18 are provided to give the top portion of the wax object a rippled effect. The top 20 of the die is conveniently flat but may be of any convenient shape, since it is not involved in the practice of the subject invention. Attached to the top by any convenient means is a handle 22 which provides a convenient hold to the die during the various operations in the forming of the wax object.

The die is prepared of a porous material which will hold its shape and to which wax will not readily adhere when the material is wet. Most conveniently, the die may be made from adobe clay which is fired, but unglazed, so as to retain porosity. By using adobe clay, the die can be easily shaped in a variety of forms to impart various structural features or textures to the wax object.

Turning now to a consideration of the method, a die is provided such as is depicted in FIG. 2. The die is immersed in cold water 24 held in any convenient container 26. The water will normally be below ambient temperatures by adding ice to the water so as to bring the temperature to 15° C. or less, more usually to 10° C. or less. While by adding other materials to the water, temperatures below 0° C. could be achieved, there is no advantage to this, and, therefore, the temperature will rarely be below about 4° C.

The mold is immersed in the water for sufficient time to absorb a substantial amount of water into the pores of the die 10. Usually, this will require about 30 minutes and not more than about 6 hours, more usually about 45 minutes to 2 hours will suffice. During this time, the mold can be retained in position by any convenient means.

After a sufficient time has passed, the mold is removed from the ice water and dipped into molten wax 28. The wax is retained in the molten condition by a burner 30 and is kept in a convenient container 32. Care is taken that the top 20 of the mold die does not go below the surface 34 of the wax. If the wax were to extend beyond the edge 36 of the die, upon cooling, it would form a structural feature which would prevent the easy release of the object from the die. The time for which the die is held in the wax is relatively short, and is primarily a matter of convenience, since upon removal from the wax bath, excess wax will drain off. The temperature of the wax melt will vary depending on the wax composition, generally being in the range of about 150° to about 180° F.

Various methods may be employed for varying the thickness of the wax. Repeated dips may be used, whereby the wax after dipping is allowed to harden to a plastic state. Alternatively, the temperature may be varied to increase or decrease the viscosity of the wax. Also, diluents may be employed to reduce the viscosity of the wax. These methods are conventional, and do not require elaboration here.

Once the die 10 is coated to form a wax coating 38 the die is removed from the wax melt and immersed in a bath of cold water 40. The water serves as a good heat transfer agent to cool the wax to the desired hardness rapidly. The temperature of the water may be ambient (20° C.) or below, preferably below, normally in the range of about 5° to 15° C. A rapid rate of cooling is desirable, but not essential to this invention. However, as a matter of convenience and for operability, a water bath will normally be used.

When the wax has hardened to substantially its solid state, the die is removed from the cold bath and the wax object 42 easily slips off from the die 10. A light tap on the handle or top of the die may be useful in effecting release.

The wax object will substantially reflect the features of the die so as to provide wide variation in the structure and shape. As already indicated, indentations can be introduced, ridges, concavities and convexities, all of which provide variations in the shape of the final wax object. As already indicated, the primary limitation is that the structural feature may not interfere with the release of the wax object from the die 10.

The wax object as formed can be used in a variety of ways for decorative purposes. It is possible to make a plurality of tulip shaped objects of varying dimensions, so that one can fit into the other. In this manner, varying shapes and contrasting colors may be employed to provide decorative effects. The wax objects can be adhered to a variety of surfaces according to conventional methods for adhering wax.

In FIG. 3, a hemispherical candle 44 is decorated with a plurality of flower shaped wax objects 46 so as to give the appearance of a bunch of wax flowers. As already indicated, more than one of the flower shaped objects may be used in a concentric manner, where the objects are of different shapes and colors, so as to provide a pleasing design. In addition, the wax objects may be modified by cutting, removing portions, or other means which might provide desirable characteristics for the wax objects.

The wax compositions which are employed are primarily candle wax derived from petroleum wax. Candle wax will normally have an AMP of from about 120° to 165° F. Normally, the wax is a petroleum refined wax. In addition to the refined wax, the presence of small amounts of other waxes is desirable. Among natural waxes, beeswax, spermaceti, carnauba, esparto, or other waxes may be conveniently used, with beeswax and spermaceti, either individually or together preferred. In addition, various synthetic waxes may be employed, which fulfill the same requirements as the natural waxes, for example, synthetic beeswax.

The waxes, other than the petroleum refined wax, will be present in total amount in at least 1 weight percent based on the petroleum refined wax, usually not more than about 40 percent, more usually from about 10 to 30 weight percent.

The wax may be modified by the addition of a hydrocarbon solvent, such as white gasoline, kerosine, etc., having a mid-boiling point in excess of about 200° F. and usually not greater than about 400° F. The use of such hydrocarbon solvents is conventional in the candle making art. The amount of hydrocarbon diluent will normally be not greater than about 30 weight percent of the entire composition and usually not greater than about 25 weight percent of the entire composition.

Various other additives may be added to provide desirable characteristics to the wax. If opacity is desired, zinc oxide or stearic acid may be added as well as other opacifiers. In addition, dyes, perfumes, metal powders, and other conventional additives may be included to enhance the attractiveness of the wax objects.

In performing this invention, a number of wax compositions were prepared and by following the procedure of the subject invention, attractive decorative floral objects were achieved.

In the first composition, 0.5 kg. of a petroleum refined wax, 100 g. of beeswax, 50 g. of spermaceti, 50 g. of white zinc oxide and 0.25 liter of gasoline were employed. The zinc oxide was dissolved in a melt of the 3 waxes, the melt allowed to cool, and then the gasoline added to provide the composition which was coated onto the die. The flowers were found to be somewhat fragile, but were easy to work with and could be cut and further shaped with scissors.

In a second composition, 1 kg. of petroleum refined wax, 300 g. of beeswax and 50 g. of spermaceti were combined with 1 tbl. of white zinc oxide. The beeswax was dissolved in the mixture of petroleum refined wax and spermaceti, followed by the addition of zinc oxide. Dyes were then introduced as desired to provide the desired coloring. The same composition was prepared without the zinc oxide to provide a transparent colored flower. The flowers were found to be strong, easily handled and were easily adhered to wax candles to decorate candles.

A third formulation which was found to be satisfactory employed 1 kg. of petroleum refined wax, 100 g. of spermaceti and 75 g. of beeswax.

A fourth composition which was also satisfactory employed 1500 g. of petroleum refined wax, 100 g. of stearic acid and 25 g. of beeswax. If an opaque wax was desired, 100 g. of zinc oxide was added to provide the desired opacity.

In accordance with the subject invention, shaped objects of relatively thin wax films are obtained in a simple and an expeditious manner. Wide variation in the shape of the wax object can be achieved, and the shaped objects can be prepared in a commercial manner or by a hobbyist. The dies are simply made and can be widely varied as to shape, so as to provide wide diversity in decoration. The method is substantially reproducible, so that the same object can be repetitively reproduced to provide the desired uniformity as a decoration. The wax objects can be used for decorating candles, floral arrangements, table settings, etc. Larger wax objects can be employed as bowls, cups, or in other decorative manners.

What is claimed is:

1. A method for preparing wax objects free of structural features which would interfere with release from a male mold die which comprises:
   introducing a porous die of fired porous adobe clay having the desired configuration into water, for a time sufficient to absorb water;
   dipping the mold die into molten wax, so that the wax adheres to the surface of the die to form a coating of the desired configuration; and
   removing the wax coated die from the wax bath and cooling the wax to a solid coat, whereby the wax coat is readily released from the die to provide an object of the desired configuration.

2. A method according to claim 1, wherein the die is dipped into a water bath at a temperature of from about 5° to 15° C.

3. A method according to claim 1, wherein said die is substantially tulip shaped.

4. A method according to claim 1, wherein the wax coating is cooled in a water bath at a temperature below ambient temperature.

5. A method for preparing wax objects of relatively thin films having a relatively conical configuration which comprises:
   dipping a male mold die of fired porous adobe clay into a water bath at a temperature of from about 5° to 15° C. for a time sufficient for the die to absorb a substantial amount of water;

transferring the wet die to a molten wax bath, wherein the die is immersed to a point below its upper edge;

removing the die from the wax bath having a substantially uniform coat of wax on the die;

immersing the wax coated die in a cold water bath for a time sufficient to harden the wax to a solid; and removing the wax coated die from the water bath, whereby the wax object is released from the die.

6. A method according to claim 5, wherein the wax in said wax bath is a mixture of petroleum refined wax and from 1 to 40 weight percent based on said petroleum refined wax of at least one of beeswax and spermaceti.

7. A method according to claim 6, wherein beeswax is present in from 10 to 30 weight percent.

8. A method according to claim 5, wherein at least one of zinc oxide or stearic acid is present in the wax.

References Cited
UNITED STATES PATENTS

| | | | |
|---|---|---|---|
| 3,026,572 | 3/1962 | Reick | 264—338 |
| 2,326,160 | 9/1943 | Neiley et al. | 264—306 |

ROBERT F. WHITE, Primary Examiner

T. E. BALHOFF, Assistant Examiner

U.S. Cl. X.R.

264—337